United States Patent
Zhao

(10) Patent No.: US 9,280,197 B1
(45) Date of Patent: Mar. 8, 2016

(54) BATTERY LEVEL PRESENTATION

(71) Applicant: Cisco Technology, Inc., San Jose, CA (US)

(72) Inventor: Qiujun Zhao, Hangzhou (CN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/634,925

(22) Filed: Mar. 2, 2015

(51) Int. Cl.
*H04N 7/14* (2006.01)
*G06F 1/32* (2006.01)
*G06F 3/0481* (2013.01)

(52) U.S. Cl.
CPC ............ *G06F 1/3212* (2013.01); *G06F 1/3203* (2013.01); *G06F 3/0481* (2013.01); *H04N 7/141* (2013.01); *H04N 7/144* (2013.01); *H04N 2007/145* (2013.01)

(58) Field of Classification Search
CPC ........................................................ H04N 7/14
USPC ....................... 348/14.01, 14.02, 14.03, 14.08
See application file for complete search history.

(56) References Cited

U.S. PATENT DOCUMENTS

| | | | |
|---|---|---|---|
| 8,265,543 B2 | 9/2012 | Knowles et al. | |
| 8,942,727 B1 * | 1/2015 | Roman | H04L 67/18 455/404.2 |
| 2006/0015609 A1 | 1/2006 | Hagale et al. | |
| 2015/0079953 A1 * | 3/2015 | Antonini | H04M 1/72519 455/414.1 |

FOREIGN PATENT DOCUMENTS

| | | |
|---|---|---|
| EP | 01215927 | 6/2002 |
| JP | 2012015808 A | 1/2012 |
| WO | WO01/10152 A1 | 2/2001 |

OTHER PUBLICATIONS

Close Talk Conference System, Presentation of News and Changes in Close Talk Control Version 3, Dec. 9, 2014 Can be seen at: http://www.close-talk.com/products_ctc_3_preview.htm.

Elghayam, Yassine, An LTL Specification and Verification of a Mobile Teleconferencing System, 2008. In Proceedings of the Second international conference on Verification and Evaluation of Computer and Communication Systems (VECoS'08). British Computer Society, Swinton, UK, 140-150.

* cited by examiner

*Primary Examiner* — Olisa Anwah
(74) *Attorney, Agent, or Firm* — Samuel M. Katz

(57) ABSTRACT

In one embodiment, a method implemented on a first computing device includes: receiving video conference data for a video conference session; receiving battery level information for at least one other computing device participating in the video conference session, where the at least one other computing device is a mobile computing device; presenting the video conference session on the first computing device, where the presenting comprises presenting a representation of the battery level information associated with at least one the mobile computing device.

20 Claims, 4 Drawing Sheets

BATTERY LEVEL PRESENTATION

FIELD OF THE INVENTION

The present invention generally relates to presenting battery levels for mobile devices participating in a video conference session.

BACKGROUND OF THE INVENTION

The increased popularity and sophistication of mobile computing devices such as computer laptops, computer tablets and smartphones, generally enable mobile users to participate in video conference sessions without regard to a current location. Such mobile computing devices are typically configured with video cameras, microphones, display screens and wireless transceivers which enable a user to connect to, and actively participate in, a video conference session. Such mobile computing devices are also typically configured with batteries to enable them to operate without being connected to an external power source.

BRIEF DESCRIPTION OF THE DRAWINGS

The present invention will be understood and appreciated more fully from the following detailed description, taken in conjunction with the drawings in which.

DESCRIPTION OF EXAMPLE EMBODIMENTS

Overview

A method implemented on a first computing device includes: receiving video conference data for a video conference session; receiving battery level information for at least one other computing device participating in the video conference session, where the at least one other computing device is a mobile computing device; presenting the video conference session on the first computing device, where the presenting comprises presenting a representation of the battery level information associated with at least one the mobile computing device.

Detailed Description of Example Embodiments

The services provided by mobile computing devices are generally limited by the capacity of their batteries. Accordingly, a common concern of mobile computing is that a device's battery may run out at an inopportune time, for example, while the user of the device is participating in a video conference session. If the battery runs out during a video conference session, the associated mobile user suddenly "disappears" from the session, inconveniencing both the affected user as well as the other participants.

Figure 1:
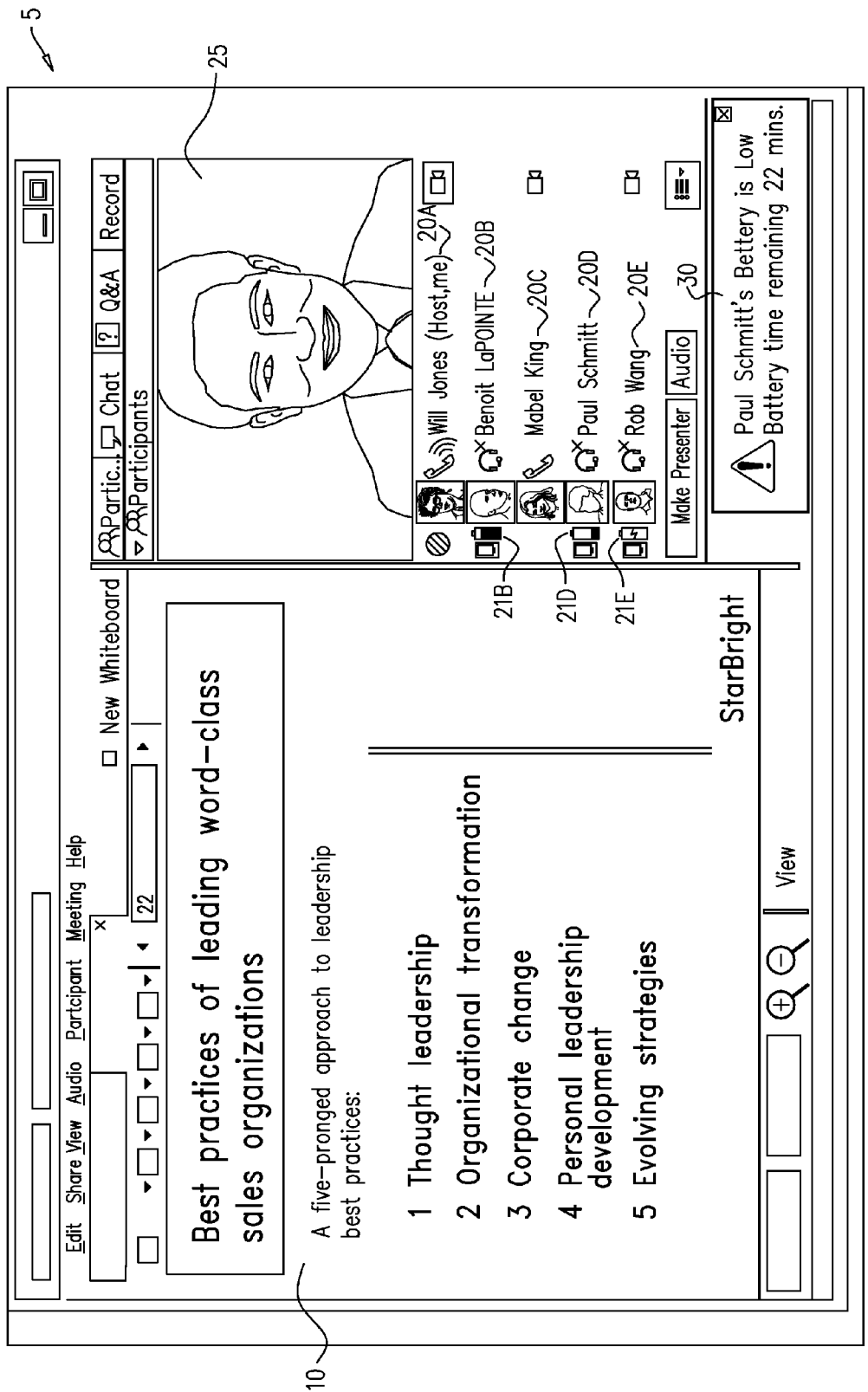
FIG. 1 is a simplified pictorial illustration of an exemplary video conference session display, constructed and operative in accordance with embodiments of the present disclosure.

Reference is now made to FIG. 1 which illustrates an exemplary video conference session display 5 as it may be displayed on the display screen of a participant of a video conference session. Display 5 may be presented by any suitably configured computing device, such as, for example, a personal computer, a mobile computing device, a video conference room or an individual video conference unit. Display 5 as depicted represents the presentation of an exemplary video session conference, comprising shared desktop view 10, participant names 20 and participant video feed 25.

It will be appreciated that as depicted in FIG. 1, display 5 may comprise other common video conference features as well, such as a variety of status indicators associated with participant names 20, for example: thumbnail images of the participants, video feed indicators, audio mute/open/active indicators, and the like. In accordance with embodiments of the present invention, display 5 may also comprise battery level indicators 21. As shown in FIG. 1, each battery level indicator 21 may be associated with a participant name 20. For example, battery level indicator 21B is associated with participant name 20B (Benoit LaPOINTE); battery level 21D is associated with participant name 20D (Paul Schmitt); and battery level indicator 21E is associated with participant name 20E (Rob Wang). It will be appreciated that battery level indicators 21 may generally be associated specifically with participant names 20 that are using mobile devices to participate in the current video conference session.

The icons used for battery level indicators 21 may indicate a current battery level for the mobile computing device used by each associated participant. For example, the percentage of the area of the icon for a battery level indicator 20 that is "filled in", i.e., black, in FIG. 1, may approximate the percentage of the charge remaining in the associated battery. Accordingly, as per the exemplary embodiment of FIG. 1, battery level indicator 21B appears to be about 80% full, thereby indicating that the associated battery, i.e., the battery on the mobile computing device used by Benoit LaPOINTE, is about 80% full. Similarly, the con for battery level indicator 21D appears to be about 15% full, thereby indicating that the battery for Paul Schmitt's mobile computing device is approximately 15% full. The icon battery level indicator 21E shows a thunderbolt symbol, thereby indicating that the associated mobile computing device, i.e. that of Rob Wang is currently charging and therefore, presumably, regardless of its battery level, Rob Wang's mobile computing device is not currently in danger of suddenly dropping out of the video conference session without warning.

It will be appreciated that, as depicted, battery level indicators 21 may only provide approximate information regarding battery levels of the associated mobile computing devices. For example, the icon of battery level indicator 21D may actually represent a 18%, charge in the associated battery, yet the difference between 15% and 18% full may not be discernable when viewing battery level indicator 21D. Accordingly, display 5 may be configured to provide a numeric representation of the percentage upon user request. For example, the user may "mouse over" battery level indicator 21D at which point a numeric representation, i.e. "18%" may be displayed over or near the display of battery level indicator 21D. It will be appreciated by one of ordinary skill in the art that other well-known user interface (UI) methods may be employed to request the numeric display. Alternatively, display 5 may be configured to display battery level indicators 21 using numeric representation by default.

Display 5 may be configured to provide a warning in the event that the battery level of a participant's battery is determined to be below a configurable battery warning threshold.

For example, as depicted in the exemplary embodiment of FIG. 1, display 5 may also comprise battery level warning 30. As depicted in FIG. 1, battery level warning 30 may indicate that Paul Schmitt's battery is now at 22%, which may be less than the configurable battery warning threshold. For example, the battery warning threshold may have been configured as 22%. Alternatively, the battery warning threshold may have been configured with a higher percentage, such as, for example, 25%.

Battery level warning 30 may be displayed in response to one or more of the battery levels as represented by battery level indicators being equal of below the battery warning threshold. It will be appreciated by one of ordinary skill in the art that the window for battery level warning level 30 may be closed by the user using known UI methods, for example, by clicking the "X" in the top right corner of battery level warning 30, inputting an F4 key combination and/or any other suitable method. It will similarly be appreciated that battery level warning 30 may be displayed repeatedly according to battery level. For example, battery level warning 30 may be displayed as soon as the battery level threshold is reached, and thereafter again each time the associated battery goes down another configurable percentage, for example, every 5%. Battery level warning 30 may also be configured with distinctive colors and/or to flash on and off in order to attract the user's attention. Alternatively, or in addition, battery level warning 30 may also be configured as an audio alert.

Figure 2:
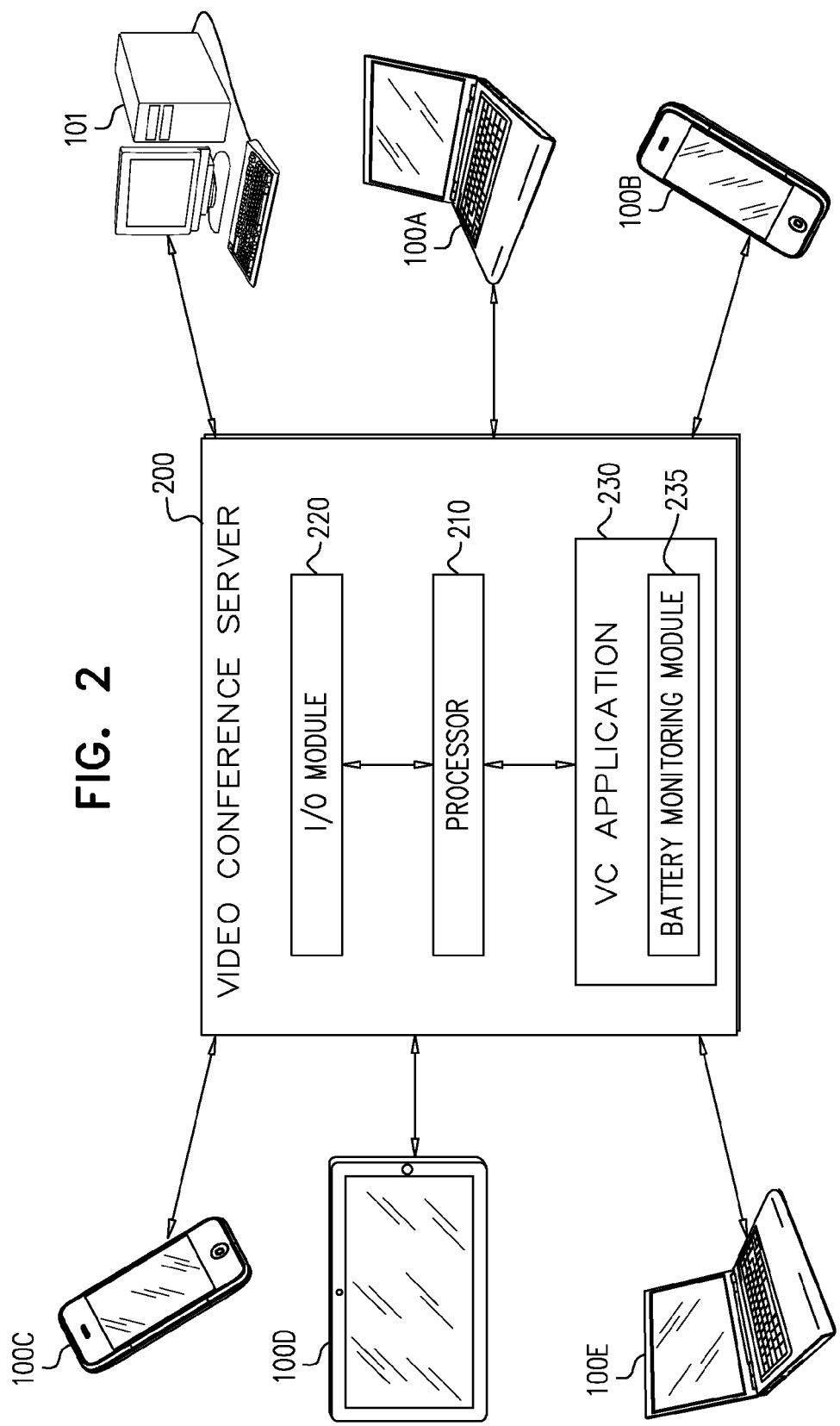
FIG. 2 is a simplified partially pictorial illustration of an video conference server in communication with client video conference devices in accordance with embodiments of the present disclosure.

Reference is now made to FIG. 2, which is a block diagram drawing of an exemplary video conference server 200, constructed and operative in accordance with embodiments of the disclosure, and arrayed in communication with mobile computing devices 100 and computing device 101. Video conference server 200 comprises at least one processor 210; I/O module 120; and video conference application 130. It will be appreciated that video conference server 200 comprises hardware and software components, such as are well-known in the art. It will similarly be appreciated that video conference server 200 may comprise other components that are not depicted in FIG. 1.

Video conference application 230 may be a server-side implementation of any suitable video conference application such as, for example, Cisco WebEx or GoToMeeting from Citrix Systems, Inc. Video conference application 230 comprises battery monitoring module 235 which, as will be discussed hereinbelow, is configured to provide battery monitoring information to one or more of the participants of a video conference session.

Video conference server 200 is configured to facilitate an exemplary video conference session between users of mobile computing devices 100 and computing device 101. Mobile computing devices 100 may be any mobile computing device operative to participate in a video conference session. For example, as depicted in FIG. 2, mobile computing devices 100A and 100E may be laptop computers; mobile computing devices 100B and 100C may be smartphones; and mobile computing device 100D may be a computer tablet. Computing device 101 may be any non-mobile computing device operative to participate in a video conference session. For example, computing device 101 may be a desktop personal computer or a dedicated video conference device or facility. It will be appreciated that the inclusion of computing device 101 in FIG. 2 may be exemplary; embodiments of the present disclosure do not necessarily require a non-mobile video conference participant. It will further be appreciated that mobile computing devices 100 are a kind of computing device, as such similar to computing devices 101. In the context of the present disclosure, mobile computing devise 100 may therefore be differentiated for other types of computing devices 100 by the ability to operate using an internal battery, as opposed to dependence on an external power source for operation.

Figure 3:
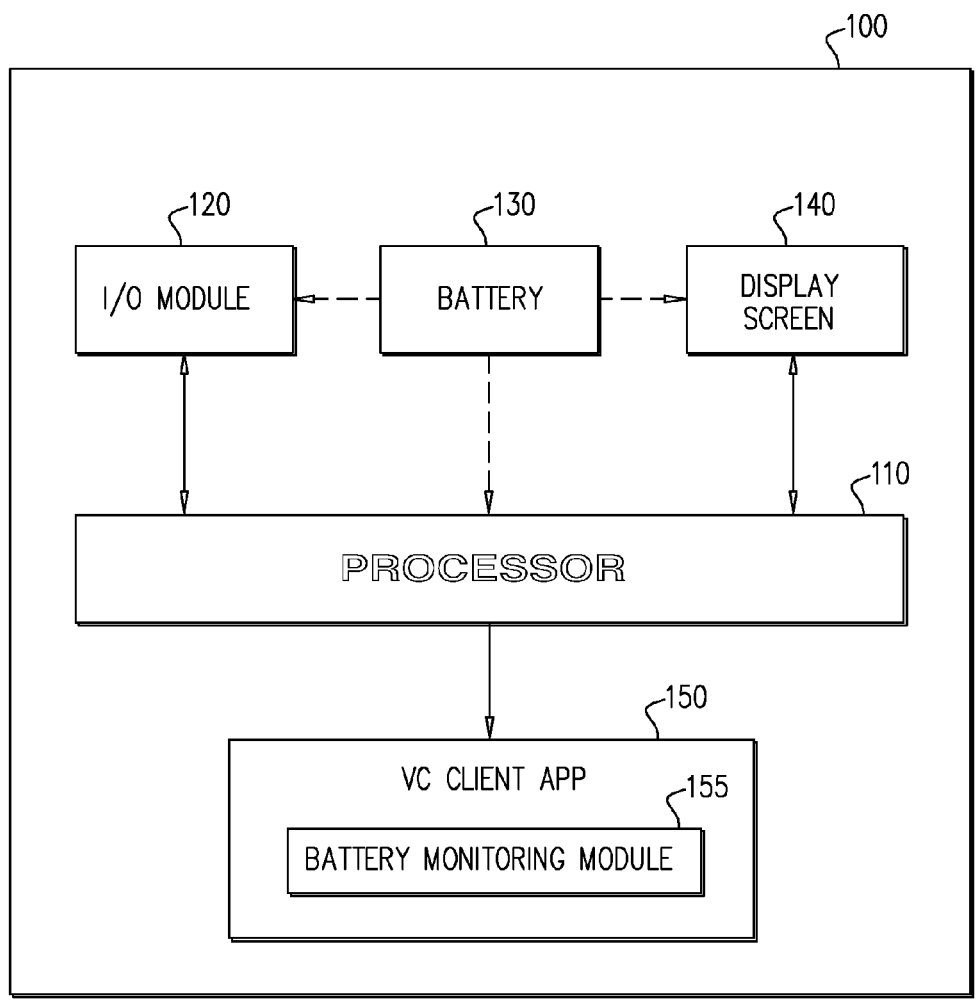
FIG. 3 is a schematic illustration of a mobile computing device in accordance with embodiments of the present disclosure.

Reference is now made to FIG. 3 which illustrates a block diagram of an exemplary mobile computing device 100. It will be appreciated by one of skill in the art that each of computing devices 100 comprises hardware and software components that may provide video conferencing functionality. For example, each mobile computing device 100 may comprise at least processor 110, I/O module 120, display screen 140 and video conference client application 150. It will be appreciated that mobile computing device 100 may also comprise at least a microphone and/or a speaker (not shown) in order to facilitate user participation in a video conference session.

It will be appreciated that mobile computing device 100 may comprise more than one processor 110. For example, one such processor 110 may be a special purpose processor operative to execute video conference client application 150. It will be appreciated that video conference client application 150 may be an application implemented in software and/or hardware on mobile computing device 100. Video conference client application 150 may be any suitable application video conferencing application such as, for example, Cisco WebEx or GoToMeeting from Citrix Systems, Inc. It will be appreciated by one of skill in the art that computing device 101 may comprise similar components to at least facilitate participation in a video conference session.

Mobile computing device 100 also comprises battery 130 to facilitate mobile usage. Video conference client application 150 may comprise battery monitoring module 155 to monitor usage of battery 130. It will be appreciated that battery monitoring module 155 may alternatively be configured as an external module called by video conference client application 150. Battery monitoring module 155 may be implemented in software and/or hardware and may configured in accordance with the operating environment of mobile computing device 100. For example, if mobile computing device 100 is an Android device, battery monitoring module 155 may be configured to use Android's BatteryManager class to determine remaining battery capacity for battery 130 and whether or not it is currently charging. It will be appreciated by one of skill in the art that similar functionality may be provided in other operating environments.

Figure 4:
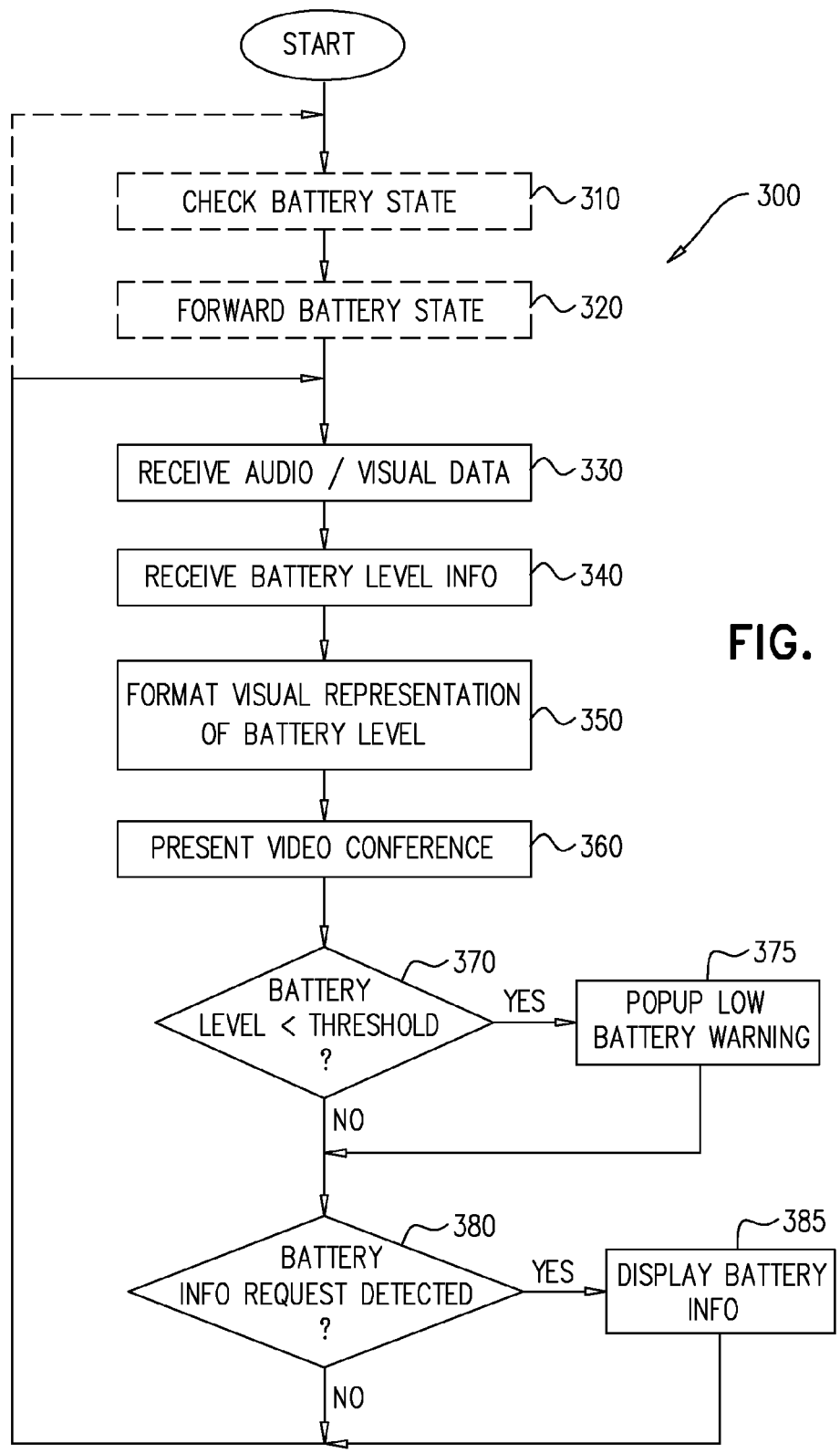
FIG. 4 is a flowchart of a battery monitoring process to be performed in accordance with embodiments of the present disclosure.

Reference is now also made to FIG. 4 which illustrates a battery monitoring process 300 to be executed by video conference client application 150 in the context of the presentation of display 5 (FIG. 1) for an associated video conference session. It will be appreciated that display 5 may be presented on any device participating in a video conference session, regardless of whether or not the device presenting display 5 comprises battery 130 (FIG. 2) or not. Accordingly, battery monitoring process 300 may be executed on either mobile computing devices 100 and/or computing devices 101. If process 300 is executed on mobile computing device 100, battery monitoring module 155 may be invoked to check (step 310) the battery state for mobile computing device 100. The battery state may include information such as, for example, remaining battery capacity for battery 130 and whether or not it is currently charging. Video conference client application 150 may forward (step 320) the battery state information to video conference server 200. It will, however, be appreciated by one of skill in the art that a given mobile computing device 101 may be configurable to allow/disallow the performance of steps 310 and 320.

It will similarly be appreciated by one of skill in the art that access to the functionality provided by process 300 may be limited. For example, in accordance with embodiments of the present disclosure, process 300 may be limited to use by the host of a current video conference session, and/or to other participants granted access by the host or otherwise.

Process 300 continues on both mobile computing device 100 and computing device 101 with video conference client application 150 receiving (step 330) audio and/or visual data from video conference server 200 via I/O module 120. Video conference client application 150 also receives (step 340) battery level information from video conference server 150. It will be appreciated by one of skill in the art, that the battery level information may be collated by battery monitoring module 235 (FIG. 2) from mobile computing devices 100 as a result of step 320 as disclosed hereinabove.

Video conference client application may format (step 350) a visual representation of the battery level based on the received battery level information. The visual representation may be, for example, in the form of battery level indicators 21 as depicted in FIG. 1. Video conference client application may present (step 360) the video conference including battery level indicators 21 as depicted in FIG. 1.

If the battery level associated with one of the participants is lower than the battery warning threshold (step 370), video conference client application 150 may "popup" (step 375) a low battery warning such as battery level warning 30 in FIG. 1. If a battery information requested is detected (step 380), video conference client application may display (step 385) the requested battery information. Step 380 may comprise, for example, detecting a mouse-over or menu driven request. Step 385 may comprise displaying an integer-based representation of battery level indicator 21.

Processing control may then return to the beginning of process 300; i.e., step 310 when processing on mobile computing device 100, and step 330 when processing on computing device 100. It will be appreciated that the performance of steps 310 and 320 may be configurable; in order to conserve resources, process 300 may be configured every "N" times that control returns to the start of process 300.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof.

What is claimed is:

1. A method implemented on a first computing device, the method comprising:
   receiving video conference data for a video conference session;
   receiving battery level information for at least one other computing device participating in said video conference session, wherein said at least one other computing device is a mobile computing device;
   presenting said video conference session on said first computing device, wherein said presenting comprises presenting a representation of said battery level information associated with at least one said mobile computing device.

2. The method according to claim 1 wherein said battery level information is associated with remaining battery capacity.

3. The method according to claim 1 wherein said battery level information is associated with a battery charging state.

4. The method according to claim 1 and comprising:
   checking battery level information on said first computing device; and
   forwarding said battery level information to said video conference server.

5. The method according to claim 1 and comprising:
   defining a battery warning threshold;
   providing an alert when said battery level information indicates that remaining battery capacity for a battery of an associated mobile computing device is below said battery warning threshold.

6. The method according to claim 5 wherein said alert is displayed.

7. The method according to claim 5 wherein said alert is an audio alert.

8. The method according to claim 5 wherein said alert is recurring.

9. The method according to claim 5 wherein said providing is not performed if said associated battery level information indicates that said battery for said mobile computing device is charging.

10. The method according to claim 1, wherein said battery level information is received from a video conference server, wherein said first computing device is connected to said video conference via said video conference server.

11. The method according to claim 6, wherein said alert is a flashing display.

12. The method according to claim 5, wherein said battery warning threshold is configurable.

13. The method according to claim 4, wherein a frequency for performance of said checking and forwarding is configurable.

14. The method according to claim 4, wherein performance of said checking and forwarding is subject to configuration on said first computing device.

15. The method according to claim 1, wherein said mobile computing device is one of a computer laptop, computer tablet or smartphone.

16. The method according to claim 1, wherein said presenting is performed for a host of said video conference session.

17. A method implemented on a video conference server, the method comprising:
   facilitating a video conference between at least two participating computing devices, wherein at least one of said computing devices is a mobile computing device;
   receiving battery level information from at least one said mobile computing device; and forwarding said battery level information to at least one of said two participating computing devices.

18. The method according to claim 17, wherein said forwarding is in accordance with a configurable list of authorized receiving participants in said video conference session.

19. A computing device comprising:
a processor;
a display screen operative to display video associated with a video conference session;
an I/O module operative to receive video conference session data, wherein said video conference session data comprises battery level information; and
a video conference client application to be executed by said processor and configured:
   to enable said computing device to participate in said video conference session, and
   to present a video conference presentation associated with said video conference session on at least said display screen, wherein said video conference presentation comprises at least a representation of said battery level information associated with at least one other computing device participating in said video conference session.

20. The computing device according to claim 1, wherein said I/O module is also operative to send said battery level information, wherein said battery level information is associated with said computing device, and said computing device is a mobile computing device.

* * * * *